United States Patent [19]

Zhou

[11] Patent Number: 5,725,073
[45] Date of Patent: Mar. 10, 1998

[54] FLUID METERING DEVICE AND COMPRESSED AIR LUBRICATOR INCLUDING SAME

[75] Inventor: Shichao K. Zhou, Highlands Ranch, Colo.

[73] Assignee: IMI Norgren, Inc., Littleton, Colo.

[21] Appl. No.: 677,372

[22] Filed: Jul. 5, 1996

[30] Foreign Application Priority Data

Jul. 7, 1995 [GB] United Kingdom ............... 95 13 949

[51] Int. Cl.[6] ............................................. F16N 7/34
[52] U.S. Cl. .................. 184/55.2; 184/59; 137/205.5; 239/317; 239/318; 239/580; 251/208
[58] Field of Search ................... 184/55.1, 55.2, 184/58, 59, 6.26, 50.2; 239/317, 318, 580, 581.1; 261/78.2, DIG. 35; 137/205.5; 251/208

[56] References Cited

U.S. PATENT DOCUMENTS

| | | |
|---|---|---|
| 2,911,008 | 11/1959 | Du Bois . |
| 3,298,393 | 1/1967 | Mosier ............................. 251/208 |
| 3,707,204 | 12/1972 | Dussardier ....................... 184/55.2 |
| 4,721,186 | 1/1988 | Fujiwara .......................... 184/55.1 |

FOREIGN PATENT DOCUMENTS 1 233 107   5/1971   United Kingdom .

*Primary Examiner*—Christopher Verdier
*Attorney, Agent, or Firm*—Cushman Darby & Cushman Intellectual Property Group of Pillsbury Madison & Sutro LLP

[57] ABSTRACT

An adjustable oil metering valve for a compressed air lubricator includes a lower, fixed member (20) having a central, downwardly extending oil delivery nozzle (30) and a peripherally ramped upper surface (29) in communication with the nozzle (30). Seated on the surface (29), and rotatable relative thereto, is a valve member (21) that includes a lower disc portion (31) having a radial channel (35) formed in its lower surface. The lower surface of the rotatable disc portion (31) and the upper surface (29) of the fixed member (20) thereby define between them a peripheral gap (H) of progressively varying height into which the oil is fed whence it flows to the nozzle (30) via the channel (35). The rate of flow of oil to the nozzle (30) is substantially proportional to the height of the gap (H) at the angular location of the outer end of the channel (35) which may be selectively varied by rotating the valve member (21). A metering valve may largely comprise simple plastics mouldings and, as such, is inexpensive to make and assemble.

11 Claims, 2 Drawing Sheets

5,725,073

FLUID METERING DEVICE AND COMPRESSED AIR LUBRICATOR INCLUDING SAME

BACKGROUND OF THE INVENTION

1. Field of the Invention

This invention relates to fluid metering devices, especially, but not exclusively, oil metering devices for use in compressed air lubricators.

2. Description of the Prior Art

It is well-known that many pneumatic devices, such as certain air-operated tools and control valves, require the compressed air to contain a lubricant in the form of an oil fog. For that purpose, compressed air lines include a lubricator that introduces a fog of oil into the flowing stream of compressed air. Almost invariably, the lubricator includes an adjustable oil metering device so that the user can adjust the amount of oil introduced into the compressed air stream depending on the lubrication requirements of the pneumatic devices in question.

Conventionally, the oil metering device usually comprises a manually adjustable needle valve which delivers, at a controlled rate, droplets of oil into the compressed air stream. Whilst of relatively simple and reliable construction, such valves are quite costly to manufacture and assemble. FIG. 1 of the accompanying drawings, which will be described in detail later, depicts a typical prior art lubricator having such an oil metering needle valve. Further, prior U.S. Pat. No. 3,707,204 assigned to the present assignees describes in detail an oil metering needle valve in current use by them.

It is an object of the present invention to provide a novel construction of a fluid metering device, especially an oil metering device suitable for use in, for example, a compressed air lubricator, that is less costly to manufacture and assemble but that nevertheless serves to meter fluid, for example oil, accurately and reliably.

SUMMARY OF THE INVENTION

According to one aspect of the present invention there is provided an adjustable fluid metering device including a first fixed member having a substantially central, fluid outlet passageway therein terminating at an upper surface thereof, and a second member superposed on said first member and having a lower surface in contact with said upper surface of the first member, said second member being rotatable relative to the first member, one of said surfaces being planar and defining therein an elongate channel whose inner end communicates with the fluid outlet passageway, and the other surface being peripherally ramped so as to afford, in communication with the outer end of said channel, a peripheral gap between the two surfaces the dimension of which, at the location of said outer end of the channel, varies in dependence upon the rotational position of the second member relative to the first member, and a fluid inlet passageway arranged to supply fluid to said peripheral gap and hence to the fluid outlet passageway via said channel.

The dimension of the variable peripheral gap between the two surfaces may vary, preferably continuously, between zero and a predetermined maximum dimension whereby fluid flow through the device may be varied from zero, i.e. an off position, to a predetermined maximum rate.

Preferably, the said lower surface of the second, rotatable member is the planar surface, the upper surface of the first, fixed member being peripherally ramped.

According to another aspect of the present invention, there is provided a compressed air lubricator including an adjustable oil metering device of the invention for regulating the amount of oil introduced into the air.

BRIEF DESCRIPTION OF THE DRAWINGS

A preferred embodiment of an adjustable metering device constructed in accordance with the invention will now be described by way of example only with reference to the accompanying drawings in which.

DESCRIPTION OF THE PREFERRED EMBODIMENT

Figure 1:
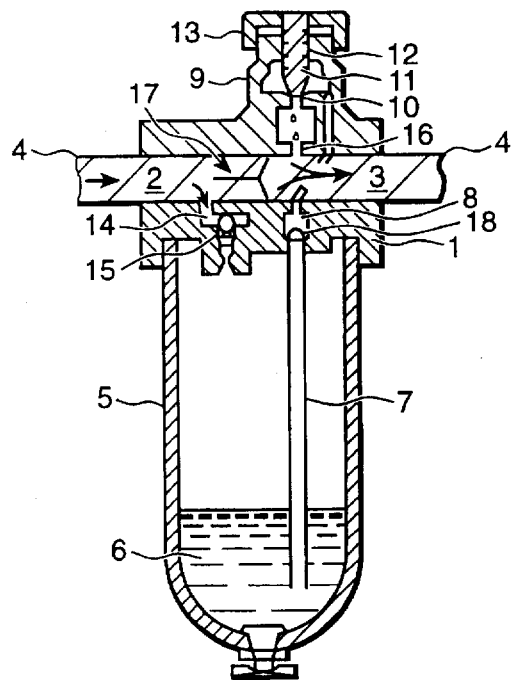
FIG. 1 is a sectional side elevation of a known type of compressed air lubricator.

Referring first to FIG. 1, a known lubricator, the general nature of which will be familiar to those skilled in the art, comprises a body 1 having an inlet 2 and outlet 3 connected into a compressed air line 4. The body 1 supports a depending bowl 5 that contains a quantity of lubricating oil 6 into which extends an open-ended, vertical tube 7 supported by the body 1. The upper end of the tube 7 communicates with the lower end of a bore 8 formed in the body 1 which, at its upper end, communicates with a so called sight feed dome 9. The sight feed dome 9 comprises a metering orifice 10, the size of which is variable by means of a tapered needle 11 that is screw-threadedly engaged at 12 in the dome 9. The needle is secured at its upper end to a manually rotatable adjusting knob 13 which, upon anti-clockwise rotation, increases the cross-sectional area of the metering orifice 10 and, conversely, upon clockwise rotation decreases it eventually closing the orifice 10 completely.

By way of a passageway 14 formed within the body 1, the compressed air inlet 2 communicates with the interior of the bowl 5 via a charge valve 15, whereby, in use, the bowl 5 becomes pressurised.

The compressed air outlet 3 communicates with the outlet side of the sight feed dome 9 below the metering orifice 10 via an oil feed passage 16. Intermediate the inlet 2 and the outlet 3, upstream of the oil feed passage 16, is located a resiliently flexible constrictor device 17 that serves, in use, to create a small pressure drop in the outlet 3 that is proportional to the air flow rate. Accordingly, when air is flowing through the lubricator, the air pressure in the outlet 3 will be slightly less than the air pressure in the bowl 5 and lubricating oil 6 in the bowl 5 therefore aspirates upwards through the tube 7 into the sight feed dome 9 via the bore 8. The oil in the sight feed dome drips into the oil feed passage 16 via the metering orifice 10 and then into the outlet 3 where the oil drops are atomised by the air flow to form an "oil fog".

At a given air flow rate, the amount of oil delivered into the air stream is governed by the setting of the metering orifice 10 and may be decreased or increased as desired by adjustment of the needle 11 using knob 13 as described earlier. The constrictor device 17 is designed such that, at a given setting of the needle 11, a nearly constant oil-to-air density ratio obtains over a wide range of air flows.

As can be seen, a check ball 18 is located at the lower end of the bore 8 and this serves to ensure that the tube 7 remains full of oil during periods of no air flow.

Typically, the needle 11 is machined from brass and is threadedly engaged at 12 with the body of the dome 9 which is in the form of a transparent plastics moulding so that the user can monitor operation of the lubricator. Such an arrangement is, as noted earlier, relatively costly to manufacture and assemble.

Figure 2:
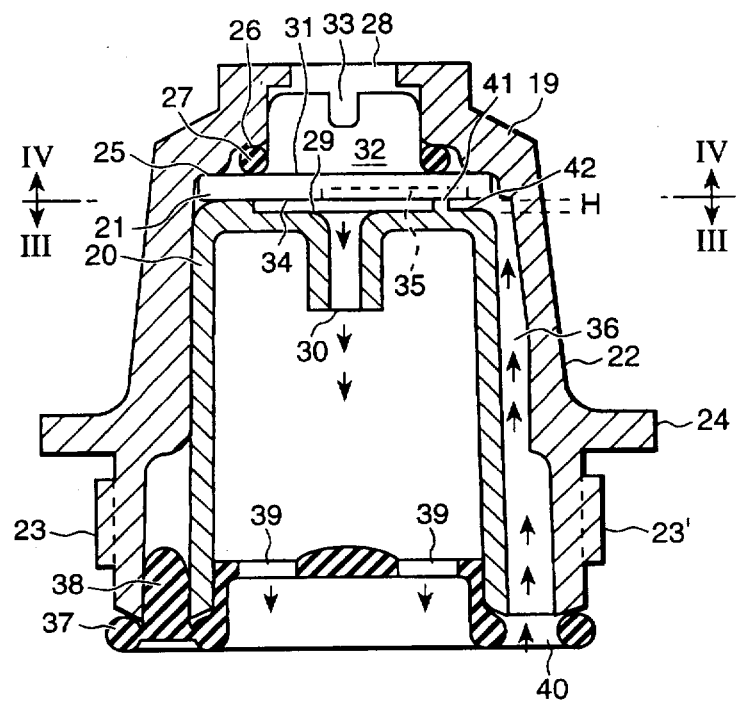
FIG. 2 is a part-sectional side elevation, on an enlarged scale, of an oil metering device constructed in accordance with the invention suitable for use with a lubricator of the type shown in FIG. 1.
Figure 3:
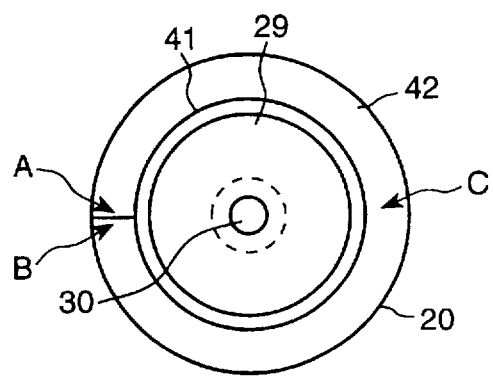
FIG. 3 is a plan view on the line III—III of FIG. 2.
Figure 4:
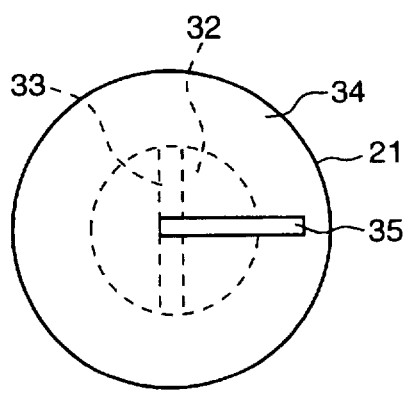
FIG. 4 is an underplan view on the line IV—IV of FIG. 2.

FIGS. 2 to 4 of the drawings illustrate one form of oil metering device constructed in accordance with the invention which does not require any threaded metal parts and which, conveniently, may comprise components that are made entirely from plastics material and that are very easy to assemble.

Referring to these Figures, the device comprises three plastics mouldings, namely an outer generally cylindrical housing 19, an inner generally cylindrical member 20 and a valve member 21. Together, these mouldings correspond to the sight feed dome 9 of the lubricator shown in FIG. 1.

The housing 19 comprises a skirt portion 22 provided with male bayonet members 23, 23' between its lower open end and a knurled annular flange 24. The bayonet members 23, 23' serve to mount the housing 19 on the body of a compressed air lubricator in analogy to the arrangement shown in FIG. 1 but the mounting could alternatively be a screw-threaded one. At the upper end of the housing 19 there are defined internally a pair of annular shoulders 25 and 26 which seat respectively the valve member 21 and an O-ring seal 27. As can be seen, the upper end of the housing 19 defines a circular opening 28.

As can be seen, the wall thickness of the skirt portion 22 gradually varies from a maximum at the left of the section shown in FIG. 2 to a minimum at the right of the section shown in FIG. 2. The member 20 is fully and coaxially received in the housing 19 and is open at its lower end. Its upper end defines an upwardly facing surface 29, the form of which is described in more detail below with reference to FIG. 3, and a downwardly extending nozzle 30.

The valve member 21 is located in place by and between the upper surface 29 of the member 20 and the internal shoulders 25 and 26 of the housing 19. It comprises a disc-like portion 31 having integrally formed with it a short cylindrical projection 32 which is formed with a slot 33 at its upper end. The disc-like portion 31 of the valve member 21 defines a lower, downwardly facing, planar surface 34 having formed in it a channel 35 that extends radially from the center of the surface 34 almost to the periphery thereof. Surface 34 engages the surface 29 of the member 20 whilst being able to rotate relative to it.

Because of the varying wall thickness of the skirt portion 22 of the housing 19, an almost complete annular passageway 36 of crescent-shaped cross-section is defined between the internal surface of the skirt portion 22 and the external, cylindrical surface of the member 20.

A moulded elastomeric seal 37 is located at the base of the assembly by means of legs, one of which is shown at 38, and this seal comprises a number of central apertures, two of which are shown at 39, and a number of circumferential apertures, one of which is shown at 40.

Referring now specifically to FIG. 3, the upper surface 29 of the member 20 has an annular ridge 41 spaced from its periphery on which the disc-like portion 31 of the valve member 21 sits. The annular part 42 of the surface 29 between the ridge 41 and its edge is ramped, that is to say that its height progressively varies, on moving through about 360°, from its highest level at which it is coplanar with the ridge 41, as at location A in FIG. 3, to its lowest level below that of the ridge, as at B in FIG. 3. Thus, the level at C in FIG. 3 will be about mid-way between the highest and lowest levels of the ramped surface 42. Accordingly, there will be a progressively varying gap H (see FIG. 2) between the planar surface 34 of the valve member 21 and the peripheral ramped surface 42. By way of example, H may vary between 0 and about 1.0 mm.

Referring additionally to FIG. 4, it can be clearly seen that the channel 35 extends radially from the centre of the disc-like portion 31 of the valve member 21 almost to its periphery. Thus, the outer end of the channel 35 communicates with the gap H, whilst its inner end communicates with the nozzle 30 of the member 20. Depending on the rotational position of the valve member 21 relative to the member 20, the outer end of the channel 35 is exposed to a smaller or larger gap H, as the case may be, and thus the rate of supply of lubricating oil to the nozzle 30 varies accordingly. Of course, when the outer end of the channel 25 is, by rotating the valve member 21 through about 180° from the position shown in FIG. 1, at location A shown in FIG. 3, H will be zero and no flow of oil will occur. The rotational position of the valve member 21 may be varied using a screwdriver inserted into the slot 33 through the opening 28 in the housing.

In use, and in analogy to the operation of the lubricator shown in FIG. 1, the differential pressure across the metering device causes lubricating oil to be aspirated into the passageway 36 via the apertures 40 etc. in the seal 37 whence it flows through the gap H and the channel 35 to the nozzle 30, as indicated by the arrows in FIG. 2. The oil then drips from the nozzle 30 and into the lubricator outlet via the central apertures 39 etc. in the seal 37, again as indicated by the arrows.

As in the case of the known metering device described in relation to FIG. 1, the device described with reference to FIGS. 2 to 4 affords, at any given setting of the valve member 21, a nearly constant oil-to-air density ratio over a wide range of air-flows.

As will be appreciated, a device of the invention may be used in a variety of other contexts and may be used to control fluid flow when in any orientation appropriate to the application in question.

It will further be appreciated that a variety of design modifications may be made to the device specifically described herein without departing from the essence of the invention as defined above. Equally, whilst it is preferred to mould all of the various components in a plastics material, and in particular the housing 19 and member 20 in a transparent plastics material, such as a polycarbonate, whereby operation of the device may be visually monitored, some or all of them could be made of metal.

I claim:

1. An adjustable fluid metering device including a first, fixed member having a substantially central, fluid outlet passageway therein terminating at an upper surface thereof, and a second member superposed on said first member and having a lower surface in contact with said upper surface of the first member, said second member being selectively rotatable relative to the first member, one of said surfaces being planar and defining therein an elongate channel whose inner end communicates with the fluid outlet passageway, and the other surface being peripherally ramped so as to afford, in communication with the outer end of said channel, a peripheral gap between the two surfaces the dimension of which, at the location of said outer end of the channel, varies in dependence upon the selected rotational position of the second member relative to the first member, and a fluid inlet passageway arranged to supply fluid to said peripheral gap and hence to the fluid outlet passageway via said channel.

2. A device according to claim 1 wherein said lower surface of said second, rotatable member defines said planar surface and said upper surface of said first, fixed member defines said peripherally ramped surface.

3. A device according to claim 2 wherein said first, fixed member comprises an inverted cup-shaped member having a substantially cylindrical side wall, an open base and a top wall having an upper surface defining said peripherally ramped surface, said fluid outlet passageway being defined by a nozzle that depends substantially centrally from said top wall into the interior of said cup-shaped member and said nozzle having an upper inlet end bounded by said upper surface of the top wall, and a lower outlet end.

4. A device according to claim 3 wherein said upper surface of said top wall of said inverted cup-shaped member is formed with a substantially annular ridge on which said planar surface of said second, rotatable member is seated, said annular ridge being located intermediate said upper inlet end of said nozzle and said peripherally ramped surface.

5. A device according to claim 4 wherein said peripherally ramped surface is substantially annular and, in a circumferential direction, progressively varies in height from a point where it is substantially coplanar with said annular ridge to a point where it lies below said ridge.

6. A device according to claim 5 wherein said second rotatable member comprises a disc-like portion having means to facilitate manual rotation thereof about a central axis perpendicular to said planar surface.

7. A device according to claim 6 wherein said means to facilitate manual rotation of the disc-like portion includes an upper extension of the disc-like portion, said extension having a slot formed therein for receiving a blade of a screwdriver.

8. A device according to claim 1 wherein said first, fixed member and said second, rotatable member comprise respective one-piece plastics mouldings.

9. A device according to claim 1 wherein said first, fixed member and said second, rotatable member are housed in a casing, the internal surface of which, together with the external surface of said first, fixed member, define said fluid inlet passageway for the supply of the fluid to said peripheral gap.

10. A device according to claim 9 wherein said casing is a one-piece plastics moulding.

11. A device according to claim 1 wherein said adjustable fluid metering device is disposed in combination with a compressed air lubricator.

* * * * *